(12) United States Patent
Desabhatla et al.

(10) Patent No.: US 12,249,921 B2
(45) Date of Patent: Mar. 11, 2025

(54) PARALLEL OPERATION OF LOAD COMMUTATED INVERTERS

(71) Applicant: General Electric Company, Schenectady, NY (US)

(72) Inventors: Sreedhar Desabhatla, Bavaria (DE); John Andrew Leonard, Roanoke, VA (US)

(73) Assignee: GE Infrastructure Technology LLC, Greenville, SC (US)

( * ) Notice: Subject to any disclaimer, the term of this patent is extended or adjusted under 35 U.S.C. 154(b) by 173 days.

(21) Appl. No.: 18/188,548

(22) Filed: Mar. 23, 2023

(65) Prior Publication Data

US 2024/0322703 A1     Sep. 26, 2024

(51) Int. Cl.
| | |
|---|---|
| *H02M 5/45* | (2006.01) |
| *H02M 1/08* | (2006.01) |
| *H02M 5/451* | (2006.01) |
| *H02P 27/06* | (2006.01) |

(52) U.S. Cl.
CPC ........... *H02M 5/4505* (2013.01); *H02M 1/08* (2013.01); *H02M 5/451* (2013.01); *H02P 27/06* (2013.01)

(58) Field of Classification Search
None
See application file for complete search history.

(56) References Cited

U.S. PATENT DOCUMENTS 9,048,691 B2    6/2015    Crane et al.

FOREIGN PATENT DOCUMENTS

| | | | |
|---|---|---|---|
| CA | 1303120 C | 6/1992 | |
| DE | 3232549 A1 | 3/1983 | |
| DE | 3006034 C2 | 6/1985 | |
| DE | 3933520 A1 * | 4/1991 | .......... H02M 5/4505 |
| EP | 0354430 B1 | 2/1990 | |
| EP | 2241001 A1 | 2/2009 | |

OTHER PUBLICATIONS

Extended European Search Report dated Sep. 8, 2024 for Application 24159991.9; pp. 11.
Mohlenkamp, et al.; "Inverter Motor with Sinusoidal Starting Currents, A New Solution With 2 DC-Links Only"; PCC—Yokohama '93; Copyright 1993 IEEE; pp. 135-140.
Hussels, et al.; "Synthesis of Cycloconverter and Current-Source-Inverter for High Power High Performance Drives"; Aachen 1989; EPE'89; Third Day of Conference; vol. 3; 3rd European Conference on Power Electronics and Applications; Oct. 9-12, 1989; pp. 1143-1148.

* cited by examiner

*Primary Examiner* — Said Bouziane
(74) *Attorney, Agent, or Firm* — James Pemrick; Charlotte Wilson; Hoffman Warnick LLC

(57) ABSTRACT

A system, including: a plurality of load commutated inverters (LCIs) connected in parallel, wherein each LCI includes: a source bridge for converting an alternating current (AC) voltage to a direct current (DC) voltage, wherein the source bridge includes at least one current switching device; a load bridge for converting the DC voltage from the source bridge to a variable frequency AC voltage; and a DC link coupling the source bridge to the load bridge; wherein each LCI includes a respective current regulator for controlling the at least one current switching device in the source bridge of the LCI to generate a current in the DC link.

16 Claims, 2 Drawing Sheets

PARALLEL OPERATION OF LOAD COMMUTATED INVERTERS

TECHNICAL FIELD

The disclosure relates generally to drive systems for high power electrical machines. In particular, the disclosure relates to the parallel operation of self commutated or load commutated inverters for driving high power electrical machines.

BACKGROUND

Load commutated inverter (LCI) drive systems are conventionally used for starting and/or operating various electrical machines such as gas turbomachines, electrical motors, compressors, pumps, and so forth. Conventionally, an LCI provides a current source to an electrical machine through the use of silicon controlled rectifiers (SCRs)—thyristors which transform, based on the current operation of the electrical machine, direct current (DC) to multiphase alternating current (AC) for supplying AC to the electrical machine. LCI drive systems are designed for operating electrical machines in both a starting operation mode, also known as a force commutated mode, and a "normal" operation mode, also known as a self commutated mode. Variable frequency AC power allows starting electrical machines without the need for auxiliary equipment.

BRIEF DESCRIPTION

All aspects, examples, and features mentioned below can be combined in any technically possible way.

An aspect of the disclosure provides a system, including: a plurality of load commutated inverters (LCIs) connected in parallel, wherein each LCI includes: a source bridge for converting an alternating current (AC) voltage to a direct current (DC) voltage, wherein the source bridge includes at least one current switching device; a load bridge for converting the DC voltage from the source bridge to a variable frequency AC voltage; and a DC link coupling the source bridge to the load bridge; wherein each LCI includes a respective current regulator for controlling the at least one current switching device in the source bridge of the LCI to generate a current in the DC link.

Another aspect of the disclosure includes the preceding aspect, and wherein the current switching device includes a silicon controlled rectifier.

Another aspect of the disclosure includes any of the preceding aspects, and wherein the same current is generated in the DC link of each LCI.

Another aspect of the disclosure includes any of the preceding aspects, and wherein each LCI further includes a gate driver for gating the at least one current switching device in the source bridge of the LCI in response to instructions received from the respective current regulator.

Another aspect of the disclosure includes any of the preceding aspects, and wherein the gating of the at least one current switching device in the source bridge of each LCI is synchronized.

Another aspect of the disclosure includes any of the preceding aspects, and wherein each LCI includes a feedback system for providing voltage and current feedback to the respective current regulator.

Another aspect of the disclosure includes any of the preceding aspects, wherein the load bridge of each LCI includes at least one current switching device, and wherein the system further includes a load bridge controller for controlling the at least one current switching device in the load bridge of the LCI to generate an output current.

Another aspect of the disclosure includes any of the preceding aspects, and wherein the same output current is generated by the load bridge of each LCI.

Another aspect of the disclosure includes any of the preceding aspects, and wherein a total current provided by the system is equal to a sum of the output currents generated by the plurality of LCIs.

Another aspect of the disclosure includes any of the preceding aspects, and wherein the system further includes an electrical machine for receiving the total current provided by the system.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
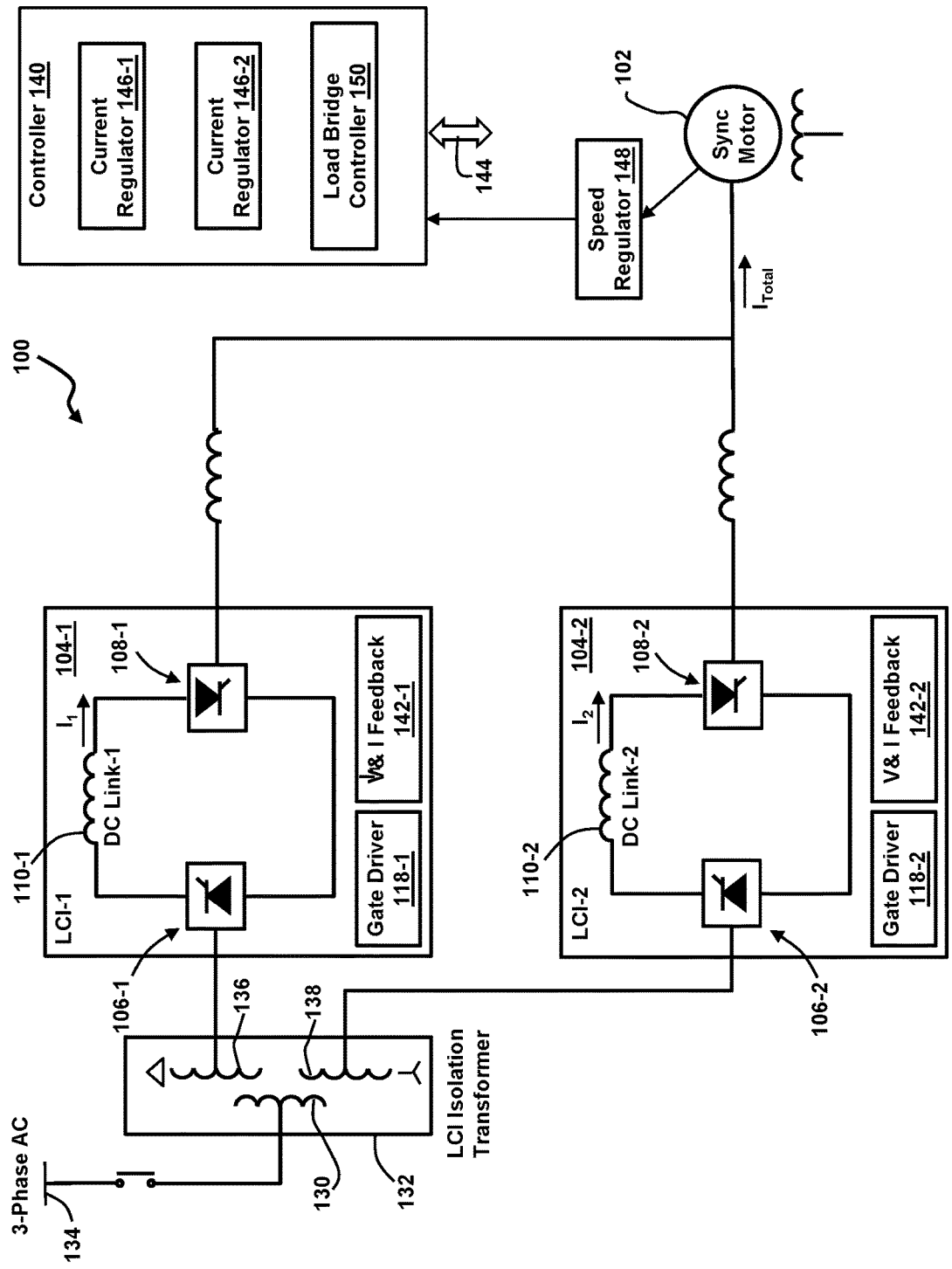
FIG. 1 is a schematic diagram of a drive system for an electrical machine, including a parallel arrangement of a plurality of load commutated inverter (LCI) systems according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current disclosure, it will become necessary to select certain terminology when referring to and describing relevant machine components within the illustrative embodiments. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. Further, the terms "first," "second," and "third," may be used interchangeably to distinguish one component from another and are not intended to signify location or importance of the individual components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event may or may not occur or that the subsequently described feature may or may not be present and that the description includes instances where the event occurs, or the feature is present and instances where the event does not occur, or the feature is not present.

Where an element or layer is referred to as being "on," "engaged to," "connected to," "coupled to," or "mounted to" another element or layer, it may be directly on, engaged, connected, coupled, or mounted to the other element or layer, or intervening elements or layers may be present. In contrast, when an element is referred to as being "directly on," "directly engaged to," "directly connected to," or "directly coupled to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The verb forms of "couple" and "mount" may be used interchangeably herein.

FIG. 1 is a schematic diagram of a drive system 100 for an electrical machine 102 according to embodiments of the disclosure. As shown, the drive system 100 includes a plurality of load commutated inverter (LCI) systems 104 (e.g., 104-1, 104-2) arranged in parallel. Although two LCI systems 104 are depicted in the drive system 100, more than two LCI systems 104 may be included in the drive system 100 (e.g., depending on the current and power (e.g., torque) requirements of the electrical machine 102). In FIG. 1, the electrical machine 102 is depicted as a synchronous motor (e.g., an alternating current (AC) electric motor in which, at steady state, the rotation of a shaft of the electrical machine 102 is synchronized with the frequency of the supply current).

According to embodiments, the drive system 100 may be used as a starting converter, a continuous duty drive, or similar system for controlling the source of power, and by extension, the speed and torque provided to various industrial machinery such as the electrical machine 102. When the drive system 100 is a starting converter, for example, (e.g., when a rotating machine (e.g., gas turbomachine) is initially started up from a generally stationary position), the drive system 100 may function as a variable speed AC drive system. Similarly, the drive system 100 may operate as a continuous duty drive. For example, the drive system 100 may operate continuously at the rated torque of the electrical machine 102, for example, from near zero to the optimal rated speed of the electrical machine 102. The drive system 100 may also include high starting and accelerating torque capabilities, which for example, may be useful for large conveyors, metal processing, rod, bar, and wire mills, as well as various extrusion, mixing, grinding and compressor applications. In certain embodiments, the drive system 100 may also include high power capability, as the drive system 100 may control both the current and power factor of the electrical machine 102 to control the torque and speed of the electrical machine 102. For example, the electrical machine 102 may be a three-phase synchronous machine, and the drive system 100, for example, may be used to start or continuously drive one or more electrical machines 102 rated at 44 mega-watts (MW) or more.

Figure 2:
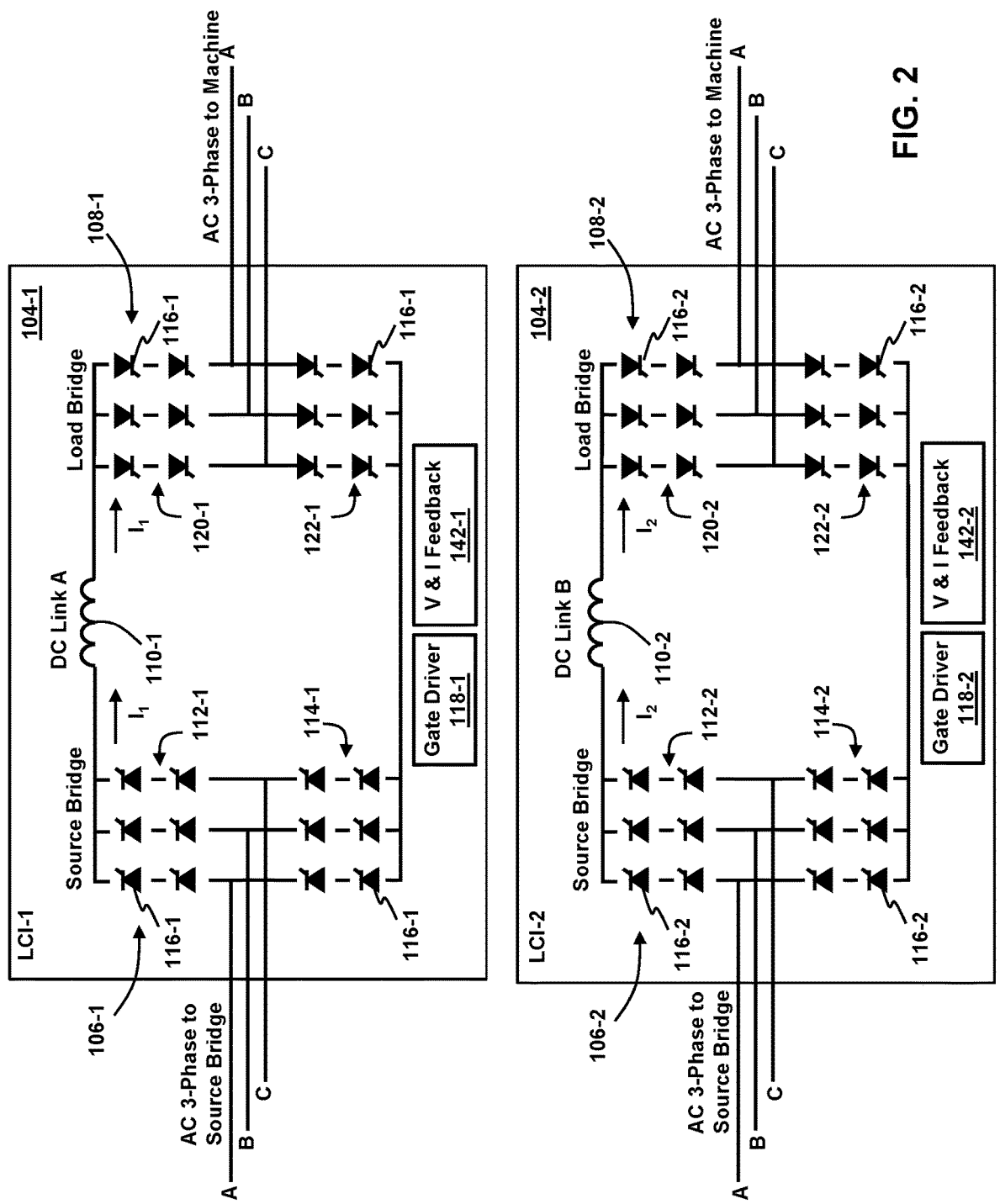
FIG. 2 depicts the drive system of FIG. 1 in greater detail according to embodiments of the disclosure.

Referring concurrently to FIGS. 1 and 2, each LCI system 104 includes a source bridge 106 (e.g., 106-1, 106-2), which is configured as a source converter to convert a 3-phase AC voltage to a DC voltage, and a load bridge 108 (e.g., 108-1, 108-2) that is configured as a load inverter to convert the DC voltage provided by the source bridge 106 to a variable frequency 3-phase AC voltage, which is supplied to the electrical machine 102. The source bridge 106 and load bridge 108 of each LCI system 104 are interconnected by a respective DC link reactor 110 (e.g., 110-1, 110-2). In general, the source bridges 106 of the LCI systems 104 may be controlled to vary the amount of current (and torque) that is furnished to the electrical machine 102, while the load bridges 108 of the LCI systems 104 may be controlled to vary the frequency of the power that is supplied to the electrical machine 102.

The source bridge 106 in each LCI system 104 generates a current I (e.g., $I_1$, $I_2$) that flows through the DC link reactor 110 to the load bridge 108. The DC link reactor 110 in each LCI system 104 provides inductance to smooth the current I delivered by the source bridge 106 to the load bridge 108. For example, the DC link reactor 110 of each LCI system 104 may limit ripple current that may flow between the source bridge 106 and the load bridge 108 as the input power is rectified from AC to DC. In operation, in each LCI system 104, the source bridge 106 regulates the magnitude of the current I flowing from the source bridge 106 to the load bridge 108 through the DC link reactor 110. The total current $I_{Total}$ provided by the drive system 100 to the electrical machine 102 is equal to the sum of the currents $I_1$, $I_2$ produced by the LCI systems 104.

As depicted in detail in FIG. 2, each source bridge 106 includes, for each phase of the 3-phase AC voltage, an upper leg 112 (e.g., 112-1, 112-2) and a lower leg 114 (e.g., 114-1, 114-2), where the upper and lower legs 112, 114 of each source bridge 106 include one or a plurality (e.g., 6) of current switching devices 116. According to embodiments, the current switching devices 116 may include, for example, silicon controlled rectifiers (SCRs)—thyristors. The gating of the current switching devices 116 of the source bridge 106 of each LCI system 104 is actuated by a respective gate driver 118 (e.g., 118-1, 118-2).

In the illustrated example, the upper and lower legs 112, 114 of each source bridge 106 include 6 current switching devices 116. The current switching devices 116 are switched in sequence (e.g., every 60 degrees) to provide a 6-pulse waveform. By having two LCI systems 104 in parallel whose AC input is shifted by 30 degrees, this results in a 12-pulse output. Such a 12 pulse output provides a less harmonic output (e.g., a more efficient power output and less torque cogging on the electrical machine 102). Additional LCI systems may be provided in parallel with the LCI systems 104 (with corresponding phase shifting of transformers) to provide a "24 pulse" or higher source bridge 106.

Similar to the source bridge 106, each load bridge 108 includes, for each phase of the 3-phase AC voltage, an upper leg 120 (e.g., 120-1, 120-2) and a lower leg 122 (e.g., 122-1, 122-2), where the upper and lower legs 120, 122 of the load bridge 108 include one or a plurality (e.g., 6) of current switching devices 116. The gating of the current switching devices 116 of the load bridge 108 of each LCI system 104 is actuated by the respective gate driver 118 of the LCI system 104 to convert the DC voltage output by the source bridge 106 to a variable frequency 3-phase AC voltage, which is provided to the electrical machine 102.

As shown in FIG. 1, the primary winding 130 of a source transformer 132 is connected to a 3-phase AC bus 134 (e.g., 2080 Vrms or higher). The source transformer 132 has two sets of 3-phase secondary windings 136, 138, where the secondary winding 136 may be delta connected and the secondary winding 138 may be wye connected. This results in a thirty degree phase shift in the voltages on the secondary windings 136, 138, which eliminates a large amount of the harmonic currents generated by the drive system 100. According to embodiments, the LCI system 104-1 is connected to the delta connected secondary winding 136 and the LCI system 104-2 is connected to the wye connected secondary winding 138.

According to embodiments, the drive system 100 further includes a single controller 140 (FIG. 1) that provides gating instructions to the gate drivers 118 for controlling the gating of the current switching devices 116 in the source and load bridges 106, 108 of the LCI systems 104 (e.g., which current switching devices 116 to gate and when to gate them). Each LCI system 104 also includes its own voltage and current feedback system 142 (e.g., 142-1, 142-2) for providing feedback regarding various voltage and/or current values in the LCI system 104 to the controller 140. In some embodiments, the controller 140 may communicate with the gate drivers 118 and the voltage and current feedback systems 142 of the LCI systems 104 via a high-speed interface 144 (e.g., a high-speed serial interface).

In the drive system 100, the current I produced by the source bridge 106 in each LCI system 104 is independently controlled by a respective current regulator 146 (e.g., 146-1, 146-2) of the controller 140. A speed regulator 148, coupled to the controller 140, is provided for monitoring and controlling the speed (and thus the torque) of the electrical machine 102. The speed regulator 148 compares a signal S representative of the speed of the electrical machine 102 to a signal S' representative of the desired speed of the electrical machine 102 and outputs a signal to the controller 140 indicating the total current $I_{Total}$ that is required from the drive system 100 to operate the electrical machine 102 at the desired speed. The controller 140 subsequently divides the required value of the total current $I_{Total}$ by the number of LCI systems 104 in the drive system 100 and sends the result to each current regulator 146. In the embodiment depicted in FIGS. 1 and 2, for example, the controller 140 sends the same value of $I_{Total}/2$ to each of the current regulators 146-1, 146-2 (e.g., $I_1=I_2=I_{Total}/2$).

As will be further appreciated, each current regulator 146 is configured to independently control the current loop within a respective LCI system 104. The source bridges 106, controlled by the managing and regulating of the firing angle, control the current in the DC link reactors 110 by changing the voltage across the DC link reactors 110. Similarly, the load bridges 108, which may also be controlled by the managing and regulating of a firing angle, may maximize the power output and control the output power factor (i.e., the phase angle between the output voltage and current). As used herein, the term firing angle may refer to the angle of the AC voltage waveform at the electrical machine 102 at which the current switching devices 116 of the load bridges 108 are gated.

The voltage and current feedback system 142-1 provides feedback regarding various voltage and current values in the LCI system 104-1 to the current regulator 146-1. Likewise, the voltage and current feedback system 142-2 provides feedback regarding various voltage and current values in the LCI system 104-2 to the current regulator 146-2. The voltage and current feedback systems 142 may be located on the AC side of each of the source and load bridges 106, 108, measuring the AC line current and AC line voltages.

According to embodiments, the current regulators 146-1, 146-2 operate completely independently from each other. In operation, based on the current feedback received from the voltage and current feedback system 142-1, the current regulator 146-1 determines and instructs the gate driver 118-1 when to gate the current switching devices 116-1 in the source bridge 106-1 to provide the required current $I_1$ (e.g., $I_{Total}/2$) in the DC link reactor 110-1. Similarly, based on the current feedback received from the voltage and current feedback system 142-2, and independent of the current regulator 146-1, the current regulator 146-2 determines and instructs the gate driver 118-2 when to gate the current switching devices 116-2 in the source bridge 106-2 to provide the required current $I_2$ (e.g., $I_{Total}/2$) in the DC link reactor 110-2. Advantageously, this ensures that there are no circulating currents between the current regulators 146-1, 146-2. Further, by using a plurality of independent current regulators 146, the source bridge 106 in each LCI system 104 will provide the same current in the DC link reactor 110 independent of the type of components used to implement the source bridges 106 and any associated cabling.

Unlike the source bridges 106, the load bridges 108 in the LCI systems 104 of the drive system 100 may not be controlled independently. According to embodiments, since the load bridges 108 are connected to the same load (e.g., electrical machine 102), a single load bridge control routine may be used. For example, a load bridge controller 152 may be configured to receive feedback from the voltage and current feedback systems 142 of the LCIs 104 regarding the load output voltage and the output current $I_1$, $I_2$ ($I_1=I_2$) of each load bridge 108. Based on this feedback and the total load current ($I_{Total}=I_1+I_2$) output by the load bridges 108, the load bridge controller 152 determines when to gate the current switching devices 116-1, 116-2 in the load bridges 108-1, 108-2 (which current switching devices 116-1, 116-2 to gate and when to gate them) to provide maximum torque to the electrical machine 102. The load bridge controller 152 subsequently sends the same gating instructions to both gate drivers 118-1, 118-2, such that the same current switching devices 116-1, 116-2 of the load bridges 108-1, 108-2 are synchronized and gated at the same time. Thus, both load bridges 108-1, 108-2 are gated in an identical manner based on the same gating instructions.

As will be appreciated by one skilled in the art, the present disclosure may be embodied as a system, method, or controls that may utilize a computer program product. Accordingly, the present disclosure may include hardware embodiments, software embodiment (including firmware, resident software, micro-code, etc.) or an embodiment combining software and hardware aspects that may all generally be referred to herein as a "circuit," "module" or "system." Furthermore, the present disclosure may take the form of a computer program enabled control embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object-oriented programming language such as Java, Smalltalk, C++, or the like and conventional procedural programming languages, such as the "C" programming language or similar programming languages. The program code may execute entirely on the user's computer, partly on the user's computer, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Also, one of ordinary skill in the art will recognize that additional blocks that describe the processing may be added. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As discussed herein, various systems and components are described as "determining" or "obtaining" data. It is understood that the corresponding data can be obtained using any solution. For example, the corresponding system/component can generate and/or be used to generate the data, retrieve the data from one or more data stores (e.g., a database), receive the data from another system/component (e.g., a sensor), and/or the like. When the data is not generated by the particular system/component, it is understood that another system/component can be implemented apart from the system/component shown, which generates the data and provides it to the system/component and/or stores the data for access by the system/component.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" or "about" as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and their practical application and to enable others of ordinary skill in the art to understand the disclosure such that various modifications to the embodiments as are suited to a particular use may be contemplated.

What is claimed is:

1. A system, comprising:
a plurality of load commutated inverters (LCIs) connected in parallel, wherein each LCI includes:

a source bridge for converting an alternating current (AC) voltage to a direct current (DC) voltage, wherein the source bridge includes at least one current switching device;

a load bridge for converting the DC voltage from the source bridge to a variable frequency AC voltage;

a DC link coupling the source bridge to the load bridge, wherein each LCI includes a respective current regulator for controlling the at least one current switching device in the source bridge of the LCI to generate a current in the DC link;

a controller;

an electrical machine; and a speed regulator coupled to the electrical machine for outputting a signal to the controller indicating a total current required by the system to operate the electrical machine at a desired speed, wherein the controller outputs a current value to each respective current regulator equal to the total current required by the system divided by the total number of LCIs.

2. The system according to claim 1, wherein the current switching device comprises a silicon controlled rectifier.

3. The system according to claim 1, wherein each LCI further includes a gate driver for gating the at least one current switching device in the source bridge of the LCI in response to instructions received from the respective current regulator.

4. The system according to claim 3, wherein the gating of the at least one current switching device in the source bridge of each LCI is independently controlled by the respective current regulator.

5. The system according to claim 1, wherein each LCI includes a feedback system for providing voltage and/or current feedback to the respective current regulator.

6. The system according to claim 1, wherein the load bridge of each LCI includes at least one current switching device, and wherein the system further includes a load bridge controller for controlling the at least one current switching device in the load bridge of each LCI to generate an output current.

7. The system according to claim 6, wherein the same output current is generated by the load bridge of each LCI.

8. The system according to claim 7, wherein a total current provided by the system is equal to a sum of the output currents generated by the plurality of LCIs.

9. A drive system, comprising:

a plurality of load commutated inverters (LCIs) connected in parallel, wherein each LCI includes:

a source bridge for converting an alternating current (AC) voltage to a direct current (DC) voltage, wherein the source bridge includes at least one current switching device;

a load bridge for converting the DC voltage from the source bridge to a variable frequency AC voltage, wherein the load bridge includes at least one current switching device; and a DC link coupling the source bridge to the load bridge, wherein each LCI includes a respective current regulator for controlling the at least one current switching device in the source bridge of the LCI to generate a current in the DC link, and wherein the respective current regulator in each LCI generates the same current in the DC link of each LCI;

a controller;

an electrical machine; and a speed regulator coupled to the electrical machine for outputting a signal to the controller indicating a total current required by the system to operate the electrical machine at a desired speed, wherein the controller outputs a current value to each respective current regulator equal to the total current required by the system divided by the total number of LCIs.

10. The system according to claim 9, wherein the current switching device comprises a silicon controlled rectifier.

11. The system according to claim 9, wherein each LCI further includes a gate driver for gating the at least one current switching device in the source bridge of the LCI in response to instructions received from the respective current regulator.

12. The system according to claim 11, wherein the gating of the at least one current switching device in the source bridge of each LCI is independently controlled by the respective current regulator.

13. The system according to claim 9, wherein each LCI includes a feedback system for providing voltage and/or current feedback to the respective current regulator.

14. The system according to claim 9, wherein the system further includes a load bridge controller for controlling the at least one current switching device in the load bridge of each LCI to generate an output current.

15. The system according to claim 14, wherein the same output current is generated by the load bridge of each LCI.

16. The system according to claim 15, wherein a total current provided by the system is equal to a sum of the output currents generated by the plurality of LCIs.

* * * * *